United States Patent [19]

Chun

[11] Patent Number: 5,671,009
[45] Date of Patent: Sep. 23, 1997

[54] CCTV SYSTEM HAVING IMPROVED DETECTION FUNCTION AND DETECTING METHOD SUITED FOR THE SYSTEM

[75] Inventor: Doo-hwan Chun, Suwon, Rep. of Korea

[73] Assignee: Samsung Electronics Co., Ltd., Kyungki-do, Rep. of Korea

[21] Appl. No.: 575,230

[22] Filed: Dec. 20, 1995

[30] Foreign Application Priority Data

Aug. 14, 1995 [KR] Rep. of Korea ............ 95-24974

[51] Int. Cl.$^6$ .............................................. H04N 7/18
[52] U.S. Cl. .................... 348/153; 348/143; 348/152; 348/154; 348/159; 340/825.15; 340/825.27; 364/146; 364/188
[58] Field of Search .................. 348/143, 152, 348/153, 154, 159; 340/825.27, 825.15; 364/146, 188

[56] References Cited

U.S. PATENT DOCUMENTS

| | | | |
|---|---|---|---|
| 4,051,524 | 9/1977 | Baxter | 348/159 |
| 4,943,854 | 7/1990 | Shiota et al. | 348/159 |
| 5,237,408 | 8/1993 | Blum et al. | 348/154 |
| 5,239,428 | 8/1993 | Nishida et al. | 360/72.2 |
| 5,396,284 | 3/1995 | Freeman | 348/154 |
| 5,526,133 | 6/1996 | Pfaff | 386/117 |

*Primary Examiner*—Howard W. Britton
*Assistant Examiner*—Frank Snow
*Attorney, Agent, or Firm*—Sughrue, Mion, Zinn, Macpeak & Seas

[57] ABSTRACT

A closed circuit television (CCTV) system with an improved detection function and a detecting method wherein, a number of camera signals, generated by multiple monitoring cameras, are recorded on a single recording medium such as a magnetic tape, corresponding ID codes are generated in accordance with predetermined physical event and time-of-day conditions. Such physical conditions include events such as video loss, fire alarms, break-ins, and so forth. The ID codes are recorded during vertical blanking periods of the camera signals, and are detected during reproduction of previously recorded video signals. The ID codes detected are compared with a user-designated value indicative of a physical event and time-of-day condition to be detected, so that an ensuing comparison match facilitates non-sequential reproduction of the camera signals corresponding to the ID codes and effectively reduces the amount of time to detect an event recorded on a recording medium, and increases detection efficiency.

19 Claims, 4 Drawing Sheets

FIG. 4

EVENT DETECTION

DESIGNATION OF EVENT TO
BE DETECTED : 1
   1. ALARM
   2. VIDEO LOSS
   3. MOTION

DESIGNATION OF TIME TO
BE DETECTED
  START : yy/mm/dd hh:mm:ss
  END : yy/mm/dd hh:mm:ss

FIG. 5

| yy/mm/dd | hh/mm/dd |
|---|---|
| | |
| CH1 | ALARM |

FIG. 6

| yy/mm/dd | hh/mm/ss |
|---|---|
| CH1 ALARM | CH2 ALARM |
| CH3 ALARM | CH4 ALARM |

CCTV SYSTEM HAVING IMPROVED DETECTION FUNCTION AND DETECTING METHOD SUITED FOR THE SYSTEM

BACKGROUND OF THE INVENTION

1. Field of the Invention

The present invention relates to a closed-circuit television (CCTV) system having an improved detection function and a detecting method suited for the system. More particularly, it relates to a CCTV system in which video signals generated through a monitoring camera can be detected according to a specific event of concern and/or time of day conditions, and a detecting method suited for the system.

The present application for a closed-circuit television (CCTV) system having an improved detection function and a detecting method, is based on Korean Application No. 95-24794 which is incorporated herein by reference for all purposes.

2. Description of the Prior Art

In a conventional CCTV system, when an abnormal condition or event, such as an intrusion by a stranger or when a fire alarm suspected, the only way to detect the abnormal condition or event is to play back a number of recording media, e.g., magnetic tapes, one at a time, storing camera signals, in order to ascertain the event by viewing a monitor screen. This detecting method is inefficient and results in a great waste of time, since the recording media for each monitoring camera should be played back in its entirety, such viewing can take a long time.

Recently, a CCTV system has been developed which comprises a plurality of monitoring cameras, a frame switching unit for switching outputs of the multiple of monitoring cameras at a frame cycle, a video cassette recorder for recording a video signal which is generated through a monitoring camera and switched in the frame switching unit, reproducing the recorded video signal, and outputting the reproduced signal to the frame switching unit, and a display divider for displaying the camera output which is reproduced in the video cassette recorder and output from the frame switching unit as a plurality of pictures. Here, the outputs of the plurality of monitoring cameras can be recorded on a single recording tape, using a single video cassette recorder, thereby reducing the time to detect a desired picture recorded on the tape.

The CCTV system as described above, however, inefficiently performs detection, since it must ascertain signals recorded on the tape from the beginning of the tape to the end, in order to ascertain an event.

Meanwhile, an example of an image recording and reproducing apparatus for rapidly detecting information recorded on a recording medium, an apparatus, is disclosed in U.S. Pat. No. 5,239,428 to Nishida et at. This image recording and reproducing apparatus is capable of performing rapid reproduction by recording identification (ID) information, indicative of positions of the starting points of recording areas on the recording tape, thereby obtaining easy access to the starting points of the recording areas.

SUMMARY OF THE INVENTION

It is an object of the present invention to provide a CCTV system in which specific event and time of day ID codes are recorded along with signals generated from a plurality of monitoring cameras.

It is another object of the present invention to provide a CCTV system which allows rapid detection of an event by detecting camera signals which are generated from a plurality of monitoring cameras, along with which event and time of day ID codes are recorded, based on the corresponding ID code.

It is still another object of the present invention to provide a detecting method suited for the CCTV system which allows rapid detection of a plurality of camera signals along with which event and time-of-day ID codes are recorded.

According to one characteristic of the invention, when recording camera signals generated from a plurality of monitoring cameras in a CCTV system, ID codes are generated according to the type of event, such as alarm, a video signal loss, or an intrusion by a stranger. Furthermore, recording-time ID codes for the events are generated, and the generated ID codes are recorded on a single recording tape during the vertical blanking periods of the camera signals.

Further, according to another characteristic of the invention, an ID code is detected, where the ID code is recorded during the vertical blanking period of a camera signal to be reproduced during a reproduction operation. The detected ID code is compared with a type of event and time it is to be detected, which are designated by a user. A camera signal whose ID code represents the type of event and time to be detected is reproduced and displayed, thereby reducing time for detection and increasing detection efficiency.

BRIEF DESCRIPTION OF THE DRAWINGS

The above objects and advantages of the present invention will become more apparent by describing in detail a preferred embodiment thereof with reference to the attached drawings in which:

FIG. 4 is a display showing a user designation mode;

FIG. 5 is a display showing on a monitor the arrangement of a full-screen picture; and FIG. 6 is a display showing on a monitor the arrangement of the multiscreen pictures.

DETAILED DESCRIPTION OF THE INVENTION

The embodiment of the present invention is described below with respect to the attached drawings.

Figure 1:
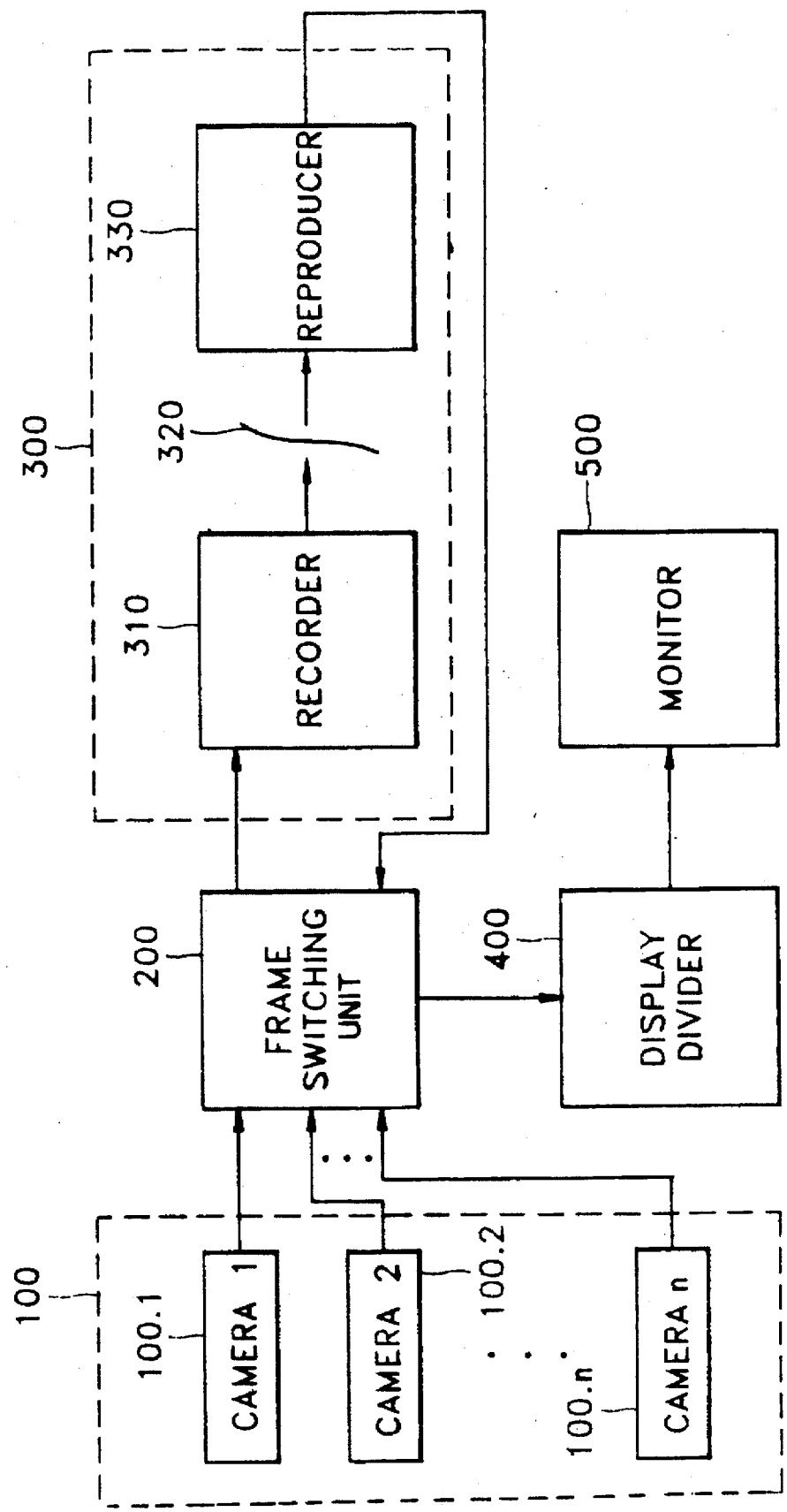
FIG. 1 is a simplified block diagram of a CCTV system according to the present invention.

FIG. 1 is a simplified block diagram of a CCTV system according to the present invention.

In FIG. 1, the CCTV system is comprised of a camera pool 100, which includes n monitoring cameras (100.1–100.n), and a frame switching unit 200 for switching between video signals generated by and output from the monitoring cameras (100.1–100.n) at a frame cycle of ⅟30 second. It also includes an image recording and reproducing device 300 with a recorder 310 for recording a camera output selected every ⅟30 seconds on a recording medium 320 and a reproducer 330 for reproducing the signal recorded on the recording medium 320 and providing the reproduced signal to the frame switching unit 200. The CCTV system also includes a display divider 400 for displaying a camera signal or camera signals reproduced by image recording and reproducing apparatus 300 in accordance with corresponding channels of image recording and reproducing apparatus 300, where each of the camera signals are reproduced as a full screen picture or multiscreen pictures on a monitor 500. In this CCTV system, a video cassette recorder (VCR) is generally used as the image recording and reproducing apparatus.

Figure 2:
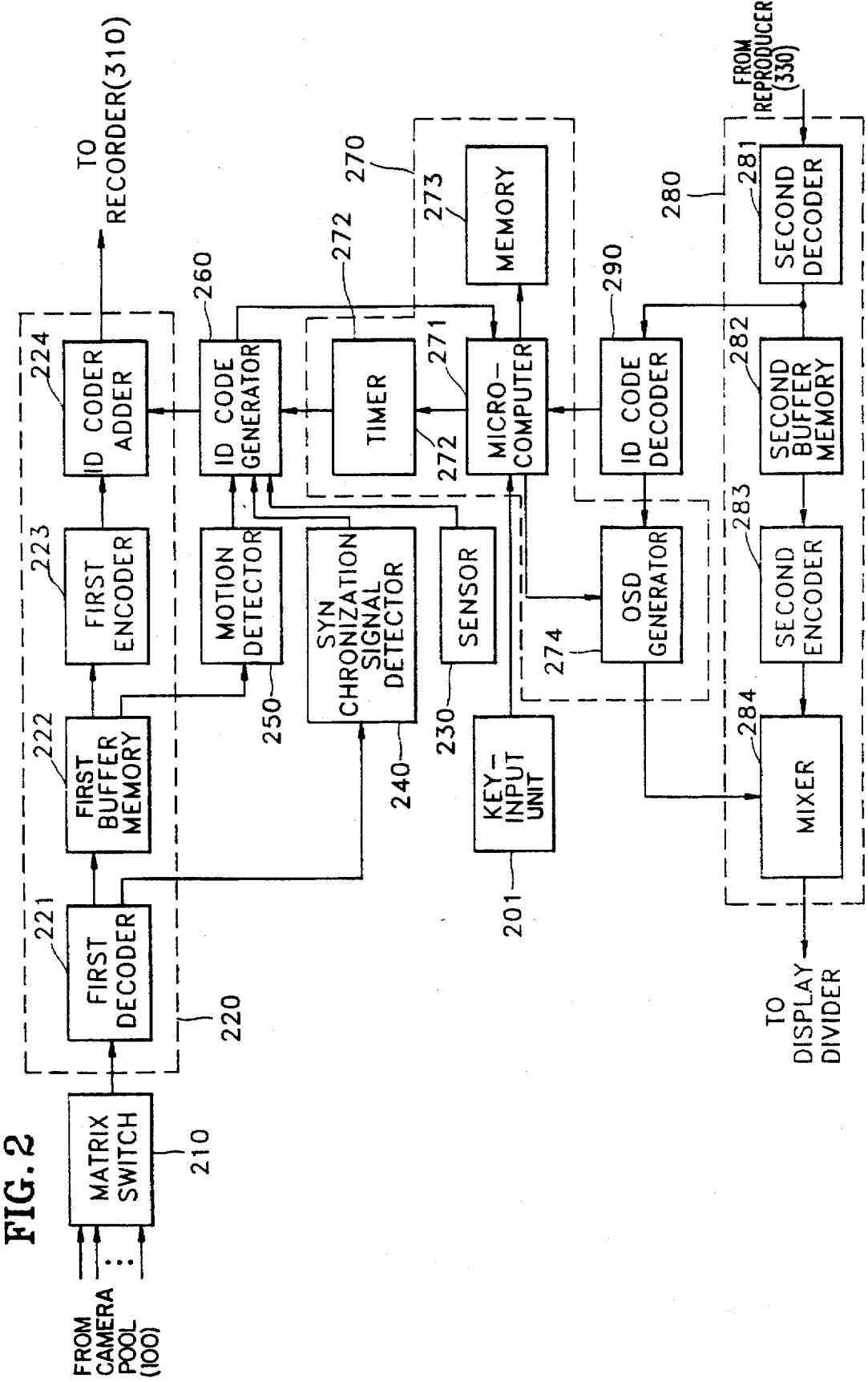
FIG. 2 is a detailed block diagram of the frame switching unit shown in FIG. 1.

FIG. 2 is a detailed block diagram of frame switching unit 200 shown in FIG. 1.

The process of recording case ID codes as per predetermined physical and/or time-of-day conditions will be described.

In FIG. 2, which shows frame switching unit 200, a matrix switch 210 switches between all of the camera outputs which are input via a plurality of channels from camera pool 100, each at a frame cycle of 1/30 seconds.

A first decoder 221 separates a camera input signal, selected with matrix switch 210, into a red-green-blue (RGB) signal, and horizontal and vertical synchronization signals.

A first buffer memory 222 stores, in units of frames, the RGB signal separated by first decoder 221. First buffer memory 222 includes an analog-to-digital converter for converting the RGB signal separated by first decoder 221 into a digital signal, and a digital-to-analog converter for converting the stored data into an analog signal.

A first encoder 223 converts the RGB signal stored, in units of frames, in first buffer memory 222 into a composite video signal.

A sensor 230 generates a sensing signal for generating an alarm, by sensing an event of the surroundings. For example, sensor 230 may be an infrared sensor for sensing smoke to detect a fire. In the present invention, sensor 230 can be provided independently of existing sensors, or the sensing signal of an existing sensor can be utilized.

A synchronization signal detector 240 detects a synchronization signal output from first decoder 221 and outputs a detection signal.

A motion detector 250 detects motion by observing differences between a previous picture frame and a present picture frame, both generated from first buffer memory 222, and outputs a detection signal based on the detected motion. Here, motion detector 250 utilizes the difference between frames of a camera output on a single channel.

An ID code generator 260 generates an ID code according to predetermined conditions, such as a break-in, a fire, and so on, based on the sensing signal generated by sensor 230. A microcomputer 271 outputs a control signal to a timer 272, upon recognizing generation of the ID code.

Timer 272 produces date and time data when an ID code is generated, and outputs the data to ID code generator 260.

The synchronization signal detector 240 outputs a first detection signal when no synchronization signal is detected from first decoder 221.

ID code generator 260 generates an ID code indicating loss of video, in response to the first detection signal output from synchronization detector 240. At this time, ID code generator 260 generates a recording-date and -time ID code based on the time and date data provided by timer 272.

Motion detector 250 detects differences between a previous picture frame and a present picture frame from an output of a camera on a channel. If the frame difference value is equal to or greater than a predetermined value, it outputs a second detection signal.

ID code generator 260 generates an ID code, in response to the second detection signal output from motion detector 250, indicating detection of motion. At this time, ID code generator 260 generates a recording-date and -time ID code based on the timing data provided by timer 272.

An ID code adder 224 adds an ID code, generated in ID code generator 260, during the vertical blanking period of the composite video signal output from first encoder 221, along with a recording-date and -time ID code, and provides the result to recorder 310, shown in FIG. 1.

Here, memory 273 stores the ID codes generated in ID code generator 260 according to predetermined physical and time-of-day conditions based on control signals, e.g., a writing signal and an address signal, generated from microcomputer 271.

The detection process performed during reproduction is described below.

A second decoder 281, whose input port is connected to the output port of reproducer 330, receives a reproduced signal and separates the signal into a RGB signal and an ID signal present in a vertical blanking period of the RGB signal.

A second buffer memory 282 stores the RGB signal separated in second decoder 281. Second buffer memory 282 has an analog-to-digital converter for converting the RGB signal separated by second decoder 281 into a digital signal, and it has a digital-to-analog converter for converting stored data into an analog signal. A second encoder 283 reads out the data of a channel stored in second buffer memory 282, in units of a frame and, during a normal reproduction operation, displays the read-out data on monitor 500 as a full-screen picture through display divider 400, or displays video signals of a channel on monitor 500 as multiscreen pictures.

Meanwhile, an ID code decoder 290 reads out the ID signal separated by second decoder 281 and determines what event, e.g. alarm, video loss or motion detection, the read-out ID represents. The result is output to microcomputer 271 and an on-screen display (OSD) generator 274.

Microcomputer 271 compares the type of event and time-of-day ID codes, which a user designates through a key-input unit 201, with the readout result in ID code decoder 290. If there exists an event corresponding to the event and time-of-day conditions to be detected, microcomputer 271 controls display divider 400 shown in FIG. 1 to display the event as a full-screen picture. If there exist two or more events corresponding to the event and time-of-day condition to be detected, microcomputer 271 controls display divider 400 to display the events as multiscreen pictures.

Further, microcomputer 271 outputs an OSD control signal to OSD generator 274 when a key-input is entered according to a user designation mode.

OSD generator 274 is comprised of a field programmable gate array (FPGA), and generates an OSD signal corresponding to the user designation mode for inputting an event to be detected, and a time-of-day condition to be detected.

Microcomputer 271 identifies the event and time-of-day condition to be detected, which have been designated by the user and received through key input unit 201, and the read-out result in ID code decoder 290. Microcomputer 271 also reads out the frame data corresponding to the event and time-of-day condition which the user designated in second buffer memory through second encoder 283, and displays the frame data on monitor 500 through display divider 400 shown in FIG. 1. Here, an OSD of the event and recording-date and -time corresponding to the ID code loaded in the frame data of the detected picture is generated in OSD generator 274 according to an OSD control signal of microcomputer 271. The generated OSD and the frame data detected in encoder 283 are mixed in a mixer 284 and displayed on monitor 500.

Here, microcomputer 271 includes a ROM with a built-in detection-processing and system-controlling program, and it initializes the user designation mode when a reset key is input through key-input unit 201.

Memory 273 stores detection list data of a predetermined duration, and thus, OSD generator 274 generates an OSD under the control of microcomputer 271. Accordingly, the OSD can be displayed on monitor 500.

The dotted-line box 220 as shown in FIG. 1, including first decoder 221, first buffer memory 222, first encoder 223, and ID code adder 224, serves as a signal processing unit. A unit serving as a system controller 270 includes a timer 272, a microcomputer 271, a memory 273, and a OSD generator 274. A second signal processing unit 280 is also shown in FIG. 2, which includes a mixer 284, a second encoder 283, a second buffer memory 282 and a second decoder 281. Here, OSD generator 274 of the present invention is provided in system controller 270, although it may be provided apart from system controller 270 as well.

Figure 3:
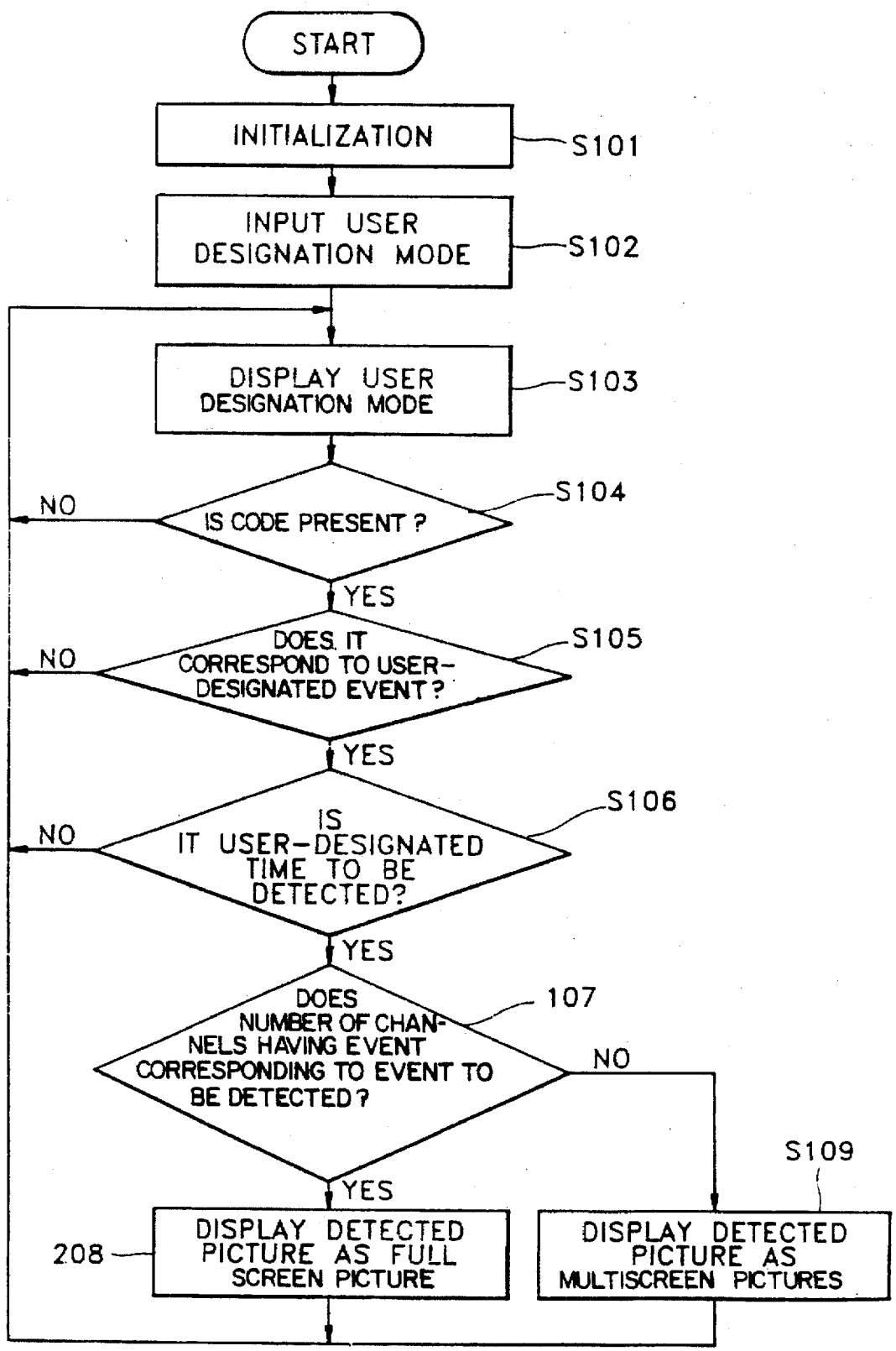
FIG. 3 is a flow-chart diagram of a detecting method performed by the microcomputer shown in FIG. 2.

FIG. 3 is a flow chart of a detecting method performed by the microcomputer shown in FIG. 2.

In step 101, when power is supplied or a reset key is activated, a user designation mode is initialized.

A user designation mode display is illustrated in FIG. 4. A user designates an event to be detected by inputting a number corresponding to the event, for example, alarm, video loss, or motion, as shown in the user designation mode display. A detection time is designated by inputting start information, in a form such as: yy(year)/mm(month)/dd (date), hh(hour)/mm(minute)/ss(second), and end information in a form such as: yy/mm/dd hh/mm/ss.

In step 103, the user designating mode designated in step 102 is displayed on the screen of monitor 500 shown in FIG. 1.

In step 104, the ID code added during the vertical blanking period is separated from the RGB signal by second decoder 281. The ID code is then read out by ID code decoder 290. If an ID code is not present in the vertical blanking period, then the procedure loops back to step 103.

When the ID code is read out, it is determined, in step 105, whether the event is identical with the user designation mode displayed in step 103. If the ID code does not represent the designated event, the procedure loops back to step 103, and an OSD corresponding to the user designation mode is displayed on monitor 500.

When the ID code represents the designated event, as determined in step 105, it is then determined in step 106 whether or not the event occurred at the detection time designated by the user.

When the recording-time of the ID code does not equal the time to be detected, the procedure returns to step 103, and the user designation mode is displayed on the screen of monitor 500 as an OSD.

When the recording-time of the ID code equals the time to be detected, it is determined, in step 107, whether one or more of the detected events are identical with the user designated event corresponding to the detection time designated in step 103.

In step 108, if there is only a single channel representing the designated event which took place at the designated time, the detected picture is displayed on monitor 500 as a full picture. A predetermined time later, the procedure returns to step 103 and the user designation mode is displayed on the screen.

In step 109, if there are two or more channels representing the designated event which took place at the designated time, the detected pictures are displayed as multiscreen pictures. Similar to the situation in which only a single channel represents the designated event, the procedure returns to step 103 a predetermined time later, and the user designation mode is displayed.

For example, in the case where the number of channels representing an alarm condition which occurred at a designated time to be detected is one, a full picture is displayed as shown in FIG. 5. If the number of channels representing an alarm condition which occurred at the designated time to be detected is two or more (in this case, four), multiscreen pictures are displayed as shown in FIG. 6.

As described above, the CCTV system according to the present invention, has the advantages that the amount of total hardware required can be significantly reduced, since a plurality of signals generated from a plurality of monitoring cameras can be sampled, combined and recorded on a single recording tape. The CCTV system according to the present invention also has the advantage that the time for detection is reduced and detection efficiency is maximized since user detection is performed according to the type of event and the time designated by a user.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed:

1. An identification code recording apparatus for use in a closed circuit television (CCTV) system which includes a plurality of monitoring cameras which output camera signals to a plurality of channels, frame switching means for switching between the plurality of channels at a frame cycle rate, thereby selecting one of the camera signals, an image recording and reproducing apparatus for recording on a recording medium the camera signal selected by the frame switching means, reproducing the recorded signal from the recording medium, and outputting the reproduced signal to the frame switching means, display dividing means for displaying on a monitor the reproduced signal corresponding to the selected camera signal output through the frame switching means, wherein the reproduced signal is displayed as a multiscreen picture, wherein said frame switching means comprises:

a plurality of camera signal input means for inputting via the plurality of channels camera signals output from the plurality of monitoring cameras;

switching means for switching between the plurality of channels, selecting one of the camera signals input to said plurality of camera signal input means, and outputting a selected camera signal, wherein said switching occurs at a predetermined frame cycle rate;

sensing means for sensing with respect to predetermined conditions and outputting a sensing signal;

first detecting means for detecting synchronization signals from said selected camera signal and outputting a first detection signal;

second detecting means for detecting motion based on said selected camera signal and outputting a second detection signal;

ID code generating means for generating an ID code in accordance with predetermined physical event and time-of-day conditions based on said sensing signal, said first detection signal and said second detection signal; and adding means for adding said ID code generated by said ID code generating means with said selected camera signal, and outputting the result to the image recording and reproducing apparatus.

2. An identification code recording apparatus as claimed in claim 1, wherein said second detecting means detects motion based on differences between different frames of said selected camera signal.

3. An identification code recording apparatus as claimed in claim 1, wherein said adding means adds said ID code generated by said ID code generating means to said selected camera signal during a vertical retrace period of said camera signal.

4. An identification code reproducing apparatus for use in a closed circuit television (CCTV) system which includes a plurality of monitoring cameras which output camera signals to a plurality of channels, frame switching means for switching between the plurality of channels at a predetermined frame cycle rate, thereby selecting one of the camera signals and outputting a selected camera signal, generating an ID code according to physical event and/or time of day conditions of the switched camera signal and adding the ID code to the switched camera signal, thereby generating an added camera signal, an image recording and reproducing apparatus for recording the added camera signal, reproducing the recorded signal and outputting the reproduced signal to the frame switching means, display dividing means for displaying, as multiscreen picture on a monitor, the camera output which is reproduced and output through the frame switching means, wherein the frame switching means comprises:

reproduced-signal input means for inputting the signal reproduced by the image recording and reproducing apparatus;

separating means for separating the ID code from the reproduced signal input from said reproduced-signal input means;

controlling means for comparing said ID code separated by said separating means with an ID value representing a user-designated physical event and time-of-day condition to be detected, and generating a display control signal;

display generating means for generating a first display signal corresponding to said user-designated condition and a second display signal corresponding to a physical event and time-of-day condition of said reproduced signal, according to said display control signal; and mixing means for mixing the ID code separated from the reproduced signal input by said reproduced signal input means with said reproduced signal corresponding to said user-designated physical event and time-of-day condition, and displaying the mixed signal on a monitor.

5. An identification code reproducing apparatus in a CCTV system as claimed in claim 4, wherein said display control signal is an on-screen display (OSD) control signal, and said first and second display signals are each OSD signals.

6. An identification code reproducing apparatus in a CCTV system as claimed in claim 4, wherein said controlling means displays the output of said mixing means as a full screen picture when only one of said channels carries an ID code corresponding to said designated physical event condition which occurs at said designated time, and displays the output of said mixing means as a multiscreen picture when more than one of said channels carries an ID code corresponding to said designated physical event condition which occurs at said designated time.

7. A detecting apparatus for use in a closed circuit television (CCTV) system comprising a plurality of monitoring cameras for outputting camera signals to a plurality of channels, frame switching means for switching between the plurality of channels at a frame cycle rate, thereby selecting one of the camera signals, an image recording and reproducing apparatus for recording on a recording medium the camera signal selected by the frame switching means, reproducing the recorded signal, and outputting the reproduced signal to the frame switching means, display dividing means for displaying the camera signal which is reproduced and output through the frame switching means as a multiscreen picture, wherein said frame switching means comprises:

a plurality of camera signal input means for inputting the camera signals output from the plurality of monitoring cameras;

switching means for switching between the plurality of channels input to said plurality of camera signal input means, thereby outputting a selected camera signal;

sensing means for outputting a sensing signal by sensing with respect to predetermined conditions;

first detecting means for detecting synchronization signals from said selected camera signal and outputting a first detection signal;

second detecting means for detecting motion based on said selected camera signal and outputting a second detection signal;

ID code generating means for generating an ID code in accordance with a predetermined physical and time-of-day conditions ID code corresponding to said sensing signal, said first detection signal and said detection signal;

adding means for adding said generated ID code to said selected camera signal during a vertical retrace period of said selected camera signal, and outputting the added result to said image recording and reproducing apparatus;

reproduced-signal input means for inputting the signal reproduced by said image recording and reproducing apparatus;

separating means for separating said ID code from the reproduced signal input from said reproduced-signal input means;

controlling means for comparing said ID code separated by said separating means with an ID value representing a user-designated physical event and time-of-day condition to be detected, and outputting a display control signal;

display generating means for generating a first display signal corresponding to said user-designated physical event and time-of-day condition to be detected and a second display signal corresponding to a physical and time-of-day condition of the recorded signal, according to said display control signal; and mixing means for mixing the ID code separated from the reproduced signal input by the reproduced-signal input means with said reproduced signal corresponding to said user-designated physical event and time-of-day conditions, and displaying the mixed signal on a monitor.

8. A detecting apparatus for use in a CCTV system as claimed in claim 7, wherein said second detecting means detects motion based on differences between frames of said selected camera signal.

9. A detecting apparatus for use in a CCTV system as claimed in claim 7, wherein said display control signal is an on-screen display (OSD) control signal, and said first and second display signals are each OSD signals.

10. A detecting apparatus for use in a CCTV system as claimed in claim 7, wherein said controlling means displays the output of said mixing means as a full screen picture when only one of said channels carries an ID code corresponding to said designated physical event condition which occurs at said designated time, and displays the output of said mixing means as a multiscreen picture when two or more of said channels carry an ID code corresponding to said designated physical event condition which occurs at said designated time.

11. A detecting apparatus for use in a CCTV system as claimed in claim 7, further comprising a memory for storing detection list data under control of said controlling means, wherein said detection list data corresponds to ID codes output from said generating means.

12. A detecting apparatus for use in a CCTV system as claimed in claim 11, wherein the output of said memory is displayed as an on-screen display (OSD) on a monitor according to said display control signal of said controlling means.

13. An image recording and reproducing apparatus for recording a signal generated from a camera on a recording medium and reproducing the recorded signal, the apparatus comprising:

input means for inputting the signal generated from the camera;

sensing means for sensing predetermined conditions and outputting a sensing signal;

first detecting means for detecting synchronization signals of the camera signal and outputting a first detection signal;

second detecting means for detecting motion based on the camera signal and outputting a second detection signal;

ID code generating means for generating an ID code in accordance with predetermined physical event and time-of-day conditions corresponding to said sensing signal, said first detection signal, and said second detection signal;

recording means for adding said ID code to the camera signal during a vertical blanking period of the camera signal, and recording the added result on the recording medium;

reproducing means for reproducing the signal recorded on the recording medium;

detecting means for detecting an ID code of the signal reproduced by said reproducing means;

controlling means for comparing the detected ID code with an ID value representing a user-designated physical event and time-of-day condition to be detected, and outputting a display control signal;

display generating means for generating a first display signal corresponding to said user-designated condition to be detected, and a second display signal corresponding to a physical event and time-of-day condition of said reproduced signal, according to said display control signal; and mixing means for mixing said detected ID code with a reproduced signal corresponding to said user-designated physical event and time-of-day condition to be detected, and displaying the mixed signal on a monitor.

14. A detecting apparatus for use in a CCTV system as claimed in claim 13, wherein said second detecting means detects motion based on differences between different frames of said camera signal.

15. A detecting apparatus for use in a CCTV system as claimed in claim 13, wherein said display control signal is an on-screen display (OSD) control signal, and said first and second display signals are each OSD signals.

16. A detecting method for use in a closed circuit television (CCTV) system for switching between a plurality of channels carrying camera signals generated from a plurality of monitoring cameras, recording a physical event and time-of-day condition ID code with one of the switched camera signals on a recording medium, reproducing a desired picture among the recorded signal recorded on the recording medium, and displaying the reproduced picture, the detecting method comprising the steps of:

(a) inputting a physical event and time-of-day condition to be detected;

(b) displaying a user designation mode corresponding to said physical event and time-of-day condition to be detected input in step (a);

(c) determining whether the ID code contained in the reproduced signal of the reproduced desired picture corresponds to said physical event and time-of-day condition input in step (a); and (d) displaying the reproduced signal when said ID code determined in step (c) corresponds to said physical event and time-of-day condition input in step (a).

17. A detecting method in a CCTV system as claimed in claim 16, wherein in step (b) said user designation mode is displayed as an on-screen display (OSD).

18. A detecting method in a CCTV system as claimed in claim 16, further comprising the step of displaying the reproduced signal as one of a full-screen picture and a multiscreen picture according to the number of channels having a camera signal that corresponds to the ID code determined in step (c) corresponding to said physical event and time-of-day condition input in step (a).

19. A detecting method in a CCTV system as claimed in claim 16, further comprising the step of returning to step (b) when said ID code is determined in step (c) not to correspond to said physical event and time-of-day condition input in step (a).

* * * * *